Patented Mar. 14, 1933

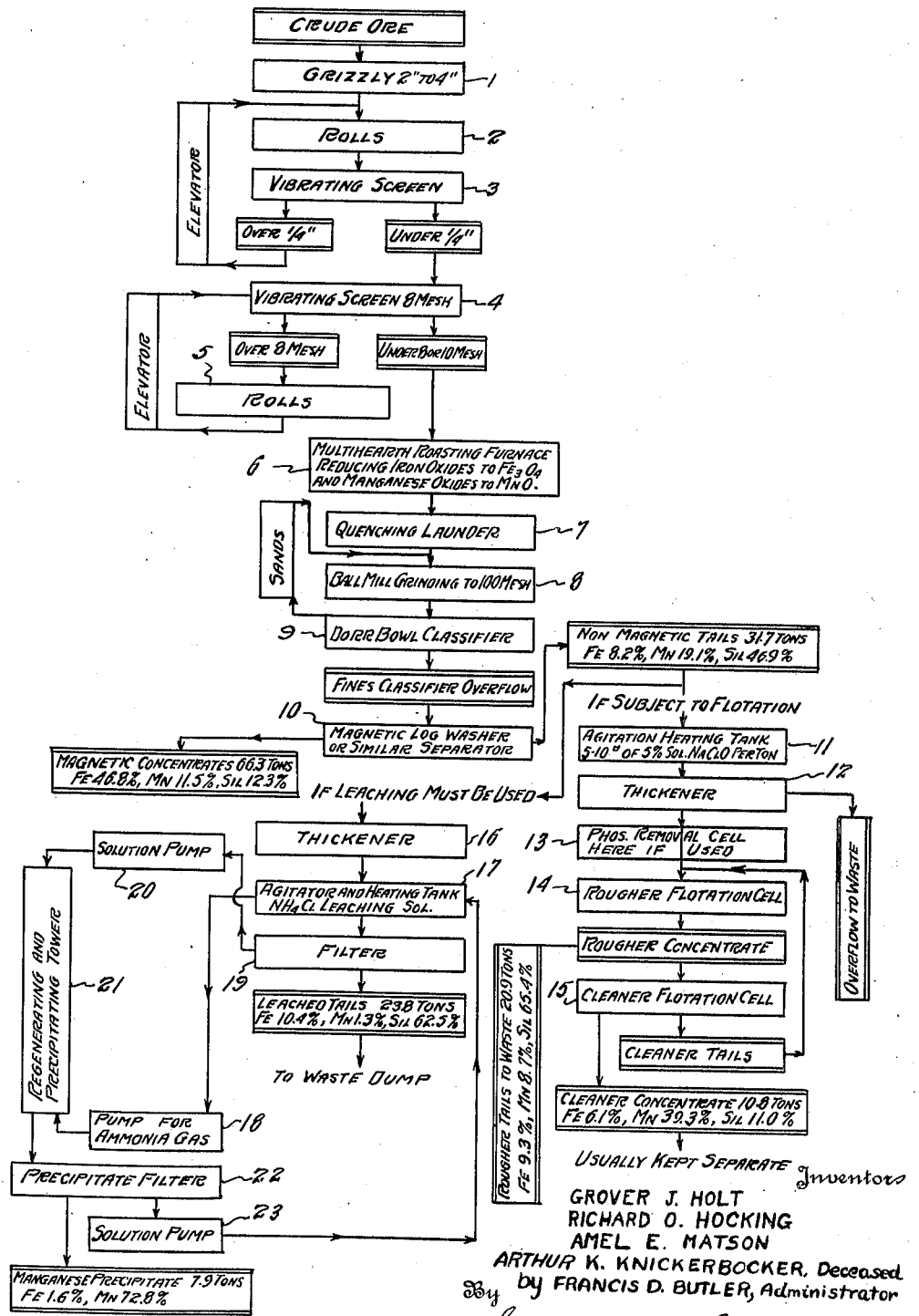

1,901,102

UNITED STATES PATENT OFFICE

GROVER J. HOLT, OF CROSBY, RICHARD O. HOCKING, OF NASHWAUK, AMEL E. MATSON, OF HIBBING, AND ARTHUR K. KNICKERBOCKER, DECEASED, LATE OF ST. PAUL, MINNESOTA, BY FRANCIS D. BUTLER, SPECIAL ADMINISTRATOR, OF ST. PAUL, MINNESOTA, ASSIGNORS TO THE RECLAMATION COMPANY, OF ST. PAUL, MINNESOTA, A CORPORATION OF DELAWARE

ORE CONDITIONING PROCESS

Application filed May 29, 1930. Serial No. 457,430.

This invention relates in general to the conditioning of ore, and more particularly has reference to processes for the treatment of ore to remove impurities therefrom and thereby increase the relative percentage of concentrates.

It has been found that certain ores, particularly of the manganiferous type, that is, ore containing iron and manganese, contain relatively large percentages of impurities. If this ore in its crude form, were treated directly to obtain the metals therefrom, the treating process would be rendered very inefficient by reason of the large amount of impurities contained therein. The principal impurities contained in ore of this type are silica and a certain amount of phosphorus. Difficulties encountered in removing impurities such as silica from crude ore prior to treatment of the ore to obtain the metal therefrom, have been recognized, and many processes and apparatus have been developed in attempts to overcome these difficulties.

In spite of the many improvements made in the prior art, considerable amounts of ore are discarded because of the relatively high silica content, it being more economical to discard the ore than to attempt to treat the ore with the known processes, to obtain a merchantable and marketable product. Most of the developments in the art of ore conditioning have been directed to improvements in separate process steps and apparatus for carrying the same into effect, so as to obtain a maximum yield of concentrates having low percentages of impurities. As yet, however, no processes have been developed which are effective for efficiently separating the maximum amount of silica possible from the ore. This lack of proper provision for the adequate separation of ores of the manganiferous type, is more outstanding than in the case of other ores.

The present invention seeks to overcome the difficulties of the prior art by the provision of processes for treatment of ore containing iron and manganese together with other impurities, so as to obtain concentrates high in manganese and concentrates high in iron content.

A major object of this invention is to provide a process for the treatment of crude ore, whereby a maximum percentage of the substantially pure ore is obtained.

Another object of this invention is the provision of an ore concentrating method, wherein raw material having substantially low metallic ore content may be conditioned so as to remove the maximum amount of impurities therefrom.

Yet another object of this invention is to devise a process for treating crude manganiferous ore to reduce the silica content and to obtain concentrates having relatively high iron content and relatively high manganese content.

A further object of this invention is to provide a method of treating manganiferous ores comprising separating the particles of the ore having a high iron content, and subsequently treating the remaining ore to obtain concentrates rich in manganese.

Another object of this invention is to provide a method of treating manganiferous ores containing phosphorus comprising separating the particles of the ore having a high iron content, treating the remaining ore to obtain the manganese and phosphorus therefrom.

Still another object of this invention is to provide a method for treating manganiferous ores which in their crude form are non-merchantable, so that the ore content may be increased to a point so as to render the same marketable.

With these and other objects in view which may appear incident to the present improvements, the invention consists in the steps and combination of steps herein set forth, with the understanding that it is within the scope of the present invention to vary the procedure herein set forth and the several steps, without departing from the spirit of the invention or the scope of the appended claims.

The present invention is based upon the concept of reducing ore to a size sufficiently small, so that the same may be subject to physical and chemical separation steps. After being reduced to the proper size, the ore is treated to render particles rich in iron oxide magnetic and to reduce the particles having a relatively high manganese dioxide content to manganous oxide (MnO).

Subsequent to this treatment, the magnetic and non-magnetic particles are separated, and the non-magnetic particles are subjected to further treatment to obtain concentrates rich in manganese. The subsequent treatment may comprise subjecting the non-magnetic particles to a flotation reaction or in leaching out the manganese from the particles, and subsequently treating the ores formed to obtain the manganese in a merchantable form.

In order to more clearly set forth the procedure and the several steps involved in the present invention, there is shown in the accompanying drawing, an outline of the process to be hereinafter described.

In the drawing:

The single figure is a diagrammatic representation or flow sheet of the process as carried out in accordance with the present invention.

When ore is treated in accordance with the present invention, the crude ore may be passed through a grizzly 1, having openings varying from 2 to 4" in size. This step tends to separate the workable ore from the large fragments which could not properly be handled in the subsequent size reducing apparatus. It of course should be obvious that the size of the openings in the grizzly may be other than those specified, depending upon the particular treatment to which the ore is to be subjected, and to the type of ore being treated.

After separating the workable fragments of ore from the extra large sizes, the workable portions are passed through a size reducing device 2, which may comprise rolls or other suitable reducing elements. The crushed ore from the rolls 2 are then passed to a sizing apparatus 3, which is shown to be a vibrating screen having ¼" openings. The size of the openings in this screen depend, of course, upon the subsequent treatment to which the ore is to be subjected and also upon the type of ore undergoing treatment.

It will also be appreciated that screens or sizing apparatus other than of the type mentioned may be employed to advantage. The material passing through the screen or separating device 3 is passed on for further treatment, and the oversize is returned to the size reducing device 2, to be further reduced in size, so that the same may pass through the apertures in the screen or sizing device 3.

The undersize from the separating device 3 is passed on to another separating device 4, adapted to make a finer separation of the material. For the treatment to be hereinafter described, it has been found that material of the size approximating eight mesh or under is advantageous. The oversize from the separating device 4 may be again crushed in any suitable manner, such as by the rolls 5, and then returned to the vibrating screen or other separating device 4 for further separation. While it has been stated that the material may be used to advantage when it has been passed through an eight mesh screen, it should be clearly understood that other sizes may be employed, depending upon the subsequent treatment of the ore and the particular type of ore undergoing treatment.

It should also be understood that while a specific sizing procedure has been described, that any other method of reducing the ore to the proper size for the subsequent treatment to be hereinafter described may be employed. While in the foregoing description, no mention has been made as to whether the crushing is done in the wet or dry state, it should be clearly understood that it is within the concept of the present invention to crush the ore either by the dry method or by the so-called wet method.

Ore treated as just described or in any other manner to reduce it to a size suitable for further processing may be preheated for drying and then is reduced at a temperature of about 550° C. This step is carried out in a reducing atmosphere in a suitable zone, indicated on the drawing by reference numeral 6, created by producer gas, blast furnace gas, or any other suitable reducing gas, so as to bring about a reduction of the iron oxides contained in the ore to magnetic iron oxide ($Fe_3O_4$). In addition to the reduction of the iron oxides, the manganese oxides are also reduced to manganous oxide (MnO).

A furnace of the multiple hearth roasting type may be advantageously employed for the reducing of the iron and manganese oxides to lower oxides. It may be found desirable to introduce the reducing gas into the lower hearths of the furnace in which case, the lower portion of the furnace will serve as a reducing zone, while the upper hearths will serve as the drying zone, and between the drying zone and the reducing zone, there will be a portion of the furnace acting as the preheating zone. It should be clearly understood that other reducing procedures and other types of roasting apparatus may be employed for carrying out the foregoing step. Furthermore, other types of reducing agents may be employed to facilitate the reduction of the iron and manganese oxides.

Upon discharge of the reduced ore from the furnace, it may be introduced into a body of water to quench the same and to prevent re-oxidation of the reduced oxides to the original form. This procedure may be effected by dropping the ore into a launder, which also serves to carry the ore to the next stage of treatment. After quenching, the ore is subjected to further grinding, to reduce the same to a size approximately one hundred mesh. This may be carried out in a ball mill or any other suitable size reducing device 8. Material from the grinding stage 8 is conveyed to a classifier 9 of the Dorr bowl type or any other suitable type, in which the coarse sands are separated and returned to the grinding stage 8 for a further reduction in size. Fines from the classifier, preferably less than one hundred mesh in size, are sent to a separating stage 10. Separation may be carried out by means of a magnetic log washer or similar device, or any other type of apparatus suitable for separating magnetic material from non-magnetic material. In this separating stage, the materials such as the fines containing high percentages of iron oxide, which was rendered magnetic by the roasting of the ore, are separated from the other particles which are relatively low in iron oxide content. It will be found that the concentrates obtained from the magnetic separation will be relatively high in iron content, so as to produce a merchantable manganiferous iron ore.

The non-magnetic particles or tailings obtained in the foregoing separation treatment are subjected to a further treatment to obtain ore high in metallic content. In accordance with the present invention, the non-magnetic particles may be subjected to either of two different treatments, depending upon the structural characteristics of the particles, or upon whether the resulting products are to be used in making ferro-manganese, or whether a product is desired which will contain manganese in a more pure form. If a ferro-manganese product is desired, a flotation treatment will prove satisfactory and more economical. However, if manganese is desired in substantially pure form, leaching may be resorted to. A process employing leaching will also prove more satisfactory where the manganese is in a finely divided state disseminated through the silica.

As above pointed out, when a ferro-manganese product is to be obtained, a flotation process is carried out. To date, the flotation of manganese in the form of manganous oxide (MnO) has not proven successful. It has been found possible, however, to treat the particles containing manganous oxide to convert the surfaces of these particles to another form of manganese, which is more susceptible to separation by flotation. This treatment may be accomplished in accordance with several distinct methods. For instance, it has been found that treatment of the ore with compounds of sulphur such as hydrogen sulphide ($H_2S$), or sodium sulphide ($Na_2S$) will convert the surface of the particles to a sulphide of manganese (MnS), which renders it more susceptible to the ordinary sulphide flotation process.

Another method of treating the particles containing the manganous oxide to render them susceptible to separation by flotation is to carbonate the particles to convert the surface thereof into a manganous carbonate ($MnCO_3$). This conversion may be carried out by introducing carbon dioxide gas into a hot pulp containing the manganous oxide.

Still another method of treating the ore to convert the surface of the particles containing manganous oxide into a form more susceptible to separation by flotation is to oxidize the surfaces of the manganous oxide particles back to manganese dioxide. This conversion may be carried out by aeration or in a more rapid manner by adding an oxidizing agent to the pulp. It has been found that very desirable results can be obtained by adding an oxidizing agent such, for example, as sodium hypochlorite. The reaction may be facilitated by heating of the pulp together with agitation. This reaction may be carried out in an agitator of any conventional type indicated on the drawing by reference numeral 11. We wish it to be clearly understood, of course, that any oxidizing agent suitable for the purpose may be employed. Also, any other oxidation procedure may be used so long as the desired results are obtained.

After subjecting the pulp to treatment to convert the surface of the particles to a form more susceptible to separation by flotation, the pulp is thickened in a convenional thickener 12. This thickener may be of the Dorr type or any other type found adequate for the purpose. Overflow from the thickener is discarded and a thickened pulp carrying about 25% of solids is subjected to further treatment.

It has been found by experiment that the phosphorus content of the finished concentrates from the magnetic separation is greatly lowered when the concentration is carried out in accordance with the process herein described. Most of the phosphorus is concentrated in the non-magnetic tailings and can easily be removed therefrom by a flotation process. This flotation reaction may be carried out in a cold solution with only a slight amount of one of the fatty acids such as oleic, stearic or palmitic, either used together or in any appropriate combination. If is it found necessary to remove phosphorus from the ore prior to further separation, this step may be carried out immediately after the thickening of the pulp.

As shown in the accompanying drawing, this stage of treatment is represented by a flotation cell having reference numeral 13. It will be appreciated that the separation of the phosphorus as carried out is a so-called selective flotation. After the flotation cell is employed to remove phosphorus, the phosphorus and an alkali concentrate may be run to waste or stored, and the tailings which constitute the desired product subjected to further treatment in order to concentrate the desired mineral contained therein. Of course, if it is not necessary to separate the phosphorus, the ore can be subjected to further treatment after being removed from the thickener.

The pulp, either from the thickener or from the phosphorus removal cell, is subjected to a flotation reaction in a suitable cell, indicated on the drawing by reference numeral 14. It may be found preferable to subject the thickened pulp to a two stage flotation reaction, in which case the concentrates will be of a high grade of purity. For instance, after being subjected to flotation in the cell 14, the concentrates may be subjected to a second flotation reaction carried out in the cleaner flotation cell 15.

Separation by flotation of the surface treated particles may be carried out in accordance with any other methods commonly used for the flotation of pulps of the type undergoing treatment. Reagents such as sodium silicate, sodium carbonate, pine oil and one of the lower fatty acids, such as oleic, stearic or palmitic, may be used to advantage in carrying out the flotation reaction. These reagents may be used together or in any appropriate combination. Of course, other reagents suitable for the purpose may be employed as desired.

In some instances, it may be sufficient to subject the pulp to a one stage flotation reaction, in which instance the cleaner flotation reaction will not be employed. It may be found to advantage, however, to employ the two stage treatment. When the latter treatment is resorted to, tailings from the cleaner flotation reaction are again sent to the thickener, from which they pass through the rough flotation stage and are subsequently subjected to the flotation reaction in the second stage.

It will be appreciated that the foregoing treatment may be modified within certain limits without departing from the scope of the present invention.

The foregoing treatment may be employed when the product desired is in the form of ferro-manganese or when the concentrates contain a relatively high percentage of iron. When there is a great dissemination of the manganese and silica, or where a pure form of manganese is desired free from any silica, the non-magnetic tailings may be subjected to a leaching reaction of any desired type, such as is commonly carried on for the recovery of manganese ore. Non-magnetic tailings from the magnetic log washer are especially amenable to a leaching process, due to the fact that most of the iron has been removed by the prior treatment. It has been found that the iron removal may be carried rather far by grinding the ore to proper fineness and by properly manipulating the temperature of the reducing furnace to effect optimum reducing conditions.

A leaching process which seems most adaptable for the tailings from the magnetic separation stage will now be described. Non-magnetic tailings from the magnetic separation stage are thickened in a suitable thickener of the Dorr type or any other suitable type desired. This stage of treatment has been indicated on the drawing by reference numeral 16. After being thickened to the proper consistency, the pulp is transferred to a conventional tank 17, wherein it is subjected to a leaching reaction. It has been found that desirable results can be obtained by leaching the pulp with a solution of ammonium chloride, the strength of which depends upon the amount of manganese present. In carrying out the reaction, the ammonium chloride solution is added and the mass is heated to approximately 85° C. and agitated until the manganese is in solution.

During the leaching reaction, the manganese goes into solution as manganous chloride, which results in liberation of ammonia in the gaseous form. The ammonia gas may be removed by means of a suitable gas pump 18 or any other device suitable for the purpose. After the reaction has been carried to substantial completeness, the mass is subjected to a treatment to effect separation of the solution from the insoluble material. This may be carried out in a conventional filter 19. The insoluble material which constitutes the leached tailings may be discarded and the solution removed for further treatment.

As shown in the flow sheet in the drawing, the solution is removed from the filter by the pump 20 and is forced to the top of a conventional tower 21. The solution is adapted to flow downwardly through the tower in direct contact with an upwardly flowing reagent adapted to react with the solution to precipitate the manganese from the solution. It has been found that when ammonia is passed upwardly through the tower in contact with the downflowing solution, that a reaction takes place, resulting in the formation of ammonium chloride solution and the formation of a precipitate of manganous hydroxide.

For the sake of economy of operation, the ammonia gas removed from the leaching tank may be employed as the precipitating reagent, make up ammonia being added if found necessary. It should be clearly understood that any other reagent capable of reacting with the manganous chloride solution to produce manganese in a desirable form may be employed.

The solution removed from the regenerating tower 21 may be subjected to a separation treatment to remove the insoluble material therefrom. For instance, the solution may be passed through filter 22 in which the manganese in the form of a precipitate is removed from the solution. If found desirable, the solution may be removed and forced by a pump 23 back to the leaching tank to be employed for further leaching of the manganese pulp.

Upon removal of the precipitate from the filter, the manganous hydroxide may be heated or sintered to produce a product which is more easily handled.

While a specific leaching process has been described in detail, it should be clearly understood that any other leaching process may be used if found advantageous. Furthermore, it is within the contemplation of the present invention to employ any combination of reducing, magnetic separation and leaching. For instance, it may be found that chlorination of the pulp may serve the purpose of removing the manganese content from the pulp.

In this instance, the pulp could be subjected to the action of a chlorine gas in order to bring the manganese into solution. It should also be clearly understood that other leaching processes can be employed to advantage so long as desirable results are obtainable.

The following results obtained from a test run starting with 100 tons of crude ore will illustrate the utility of the present invention. The original ore was found on analysis to contain iron 33.7%, manganese 14% and silica 24%. The concentrates from the magnetic log washer amounted to 66.2 tons and had a composition of iron 46.8%, manganese 11.5% and silica 12.3%. About 31.7 tons of nonmagnetic tailings were obtained which when analyzed contained iron 8.2%, manganese 19.1% and silica 46.9%. The concentrates obtained after subjecting the ore to flotation comprised 10.8 tons and assayed iron 6.1%, manganese 39.3% and silica 11%. It will be noted that the concentrates obtained after the flotation reaction had a relatively high manganese content. Tailings obtained from the flotation reaction amounted to about 20.9 tons and on analysis showed a content of iron 9.3%, manganese 8.7% and silica 65.4%.

After subjecting the ore to leaching, it was found that the concentrates obtained were relatively high in manganese content. In the specific test run 7.9 tons of concentrates were obtained having a composition of iron 1.6% and manganese 72.8%.

It will be noted that in accordance with the present process, three different types of concentrates may be obtained. For instance, the concentrates from the magnetic separation stage were relatively high in iron, whereas those obtained by subjecting the nonmagnetic tailings to flotation contained considerable manganese, and the concentrates obtained by leaching were extremely high in manganese.

While we have shown and described the preferred embodiment of our invention, we wish it to be understood that we do not confine ourselves to the precise details of procedure herein set forth, by way of illustration, as it is apparent that many changes and variations may be made therein by those skilled in the art, without departing from the spirit of the invention, or exceeding the scope of the appended claims.

We claim:

1. A method of conditioning manganiferous ore comprising sizing the ore, converting the iron content into magnetic iron oxide, and the manganese content into manganous oxide, separating the particles having a high iron content, sulphidizing the remainder to render the manganese compound more susceptible to separation by flotation and then subjecting the treated material to flotation.

2. A method of conditioning manganiferous ore comprising sizing the ore, converting the iron content into magnetic iron oxide, and the manganese content into manganous oxide, separating the particles having a high iron content, oxidizing the remainder to render the manganese compound more susceptible to separation by flotation and then concentrating the material by flotation.

3. A method of conditioning manganiferous ore comprising sizing the ore, converting the iron content into magnetic iron oxide, and the manganese content into manganous oxide, separating the particles having a high iron content, treating the surface of the manganese containing particles to render the same more susceptible to flotational separation, and then subjecting the material to flotation.

4. A method of conditioning manganiferous ore comprising sizing the ore, converting the iron content into magnetic iron oxide, and the manganese content into manganous oxide, separating the particles having a high iron content, carbonating the remainder to render the manganese compound more susceptible to flotational separation, and then subjecting the treated material to flotation.

5. A method of conditioning manganiferous iron ore comprising the steps of converting the iron content into magnetic iron oxide and the manganese into manganous oxide, separating the magnetic particles, treating the remainder with an oxidizing agent to convert the manganous oxide particles to manganese dioxide, and then concentrating the so treated material by flotation.

6. A method of treating manganiferous iron ore comprising converting the iron content into magnetic iron oxide and the manganese content into manganous oxide, separating the magnetic particles, aerating the remainder to convert the manganous oxide to manganese dioxide, and then concentrating the aerated material by flotation.

7. A method of treating a phosphorus-containing manganiferous iron ore comprising the steps of sizing the ore, converting the iron content into magnetic iron oxide and the manganese into manganous oxide, removing the magnetic content, oxidizing the manganese in the non-magnetic portion, removing the phosphorus therefrom, and then concentrating the material by flotation.

8. A method of treating a phosphorus-containing manganiferous iron ore comprising the steps of converting the iron to magnetic iron oxide and the manganese to manganous oxide, removing the magnetic particles, subjecting the remainder to the action of an oxidizing agent, removing the phosphorus from the oxidized portion and then concentrating the material by flotation.

9. A method of treating a phosphorus-containing manganiferous iron ore comprising the steps of sizing the ore, converting the iron content into magnetic iron oxide and the manganese into manganous oxide, separating the magnetic particles, aerating the remainder to convert the manganous oxide to manganese dioxide, removing the phosphorus therefrom and then concentrating the material by flotation.

10. In a method of conditioning manganiferous iron ore, the steps of rendering the iron content magnetic, subjecting the ore to a magnetic separation step to remove the magnetic constituents, treating the magnetic tailings to render the manganese therein susceptible to flotation, and subjecting such treated tailings to a flotation process.

In testimony whereof we affix our signatures.

GROVER J. HOLT.
RICHARD O. HOCKING.
AMEL E. MATSON.
FRANCIS D. BUTLER,
*Special Administrator of the Estate of Arthur K. Knickerbocker, Deceased.*